United States Patent
Otaki et al.

(10) Patent No.: US 10,130,887 B2
(45) Date of Patent: Nov. 20, 2018

(54) VALUE COMPUTING SYSTEM AND A STORAGE MEDIUM STORING A COMPUTER PROGRAM FOR VALUE COMPUTING

(75) Inventors: Tadanobu Otaki, Minato-ku (JP); Masahiko Kami, Minato-ku (JP); Jiro Hotta, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 1118 days.

(21) Appl. No.: 13/981,007

(22) PCT Filed: Dec. 28, 2011

(86) PCT No.: PCT/JP2011/080416
§ 371 (c)(1),
(2), (4) Date: Jul. 22, 2013

(87) PCT Pub. No.: WO2012/111239
PCT Pub. Date: Aug. 23, 2012

(65) Prior Publication Data
US 2013/0303272 A1   Nov. 14, 2013

(30) Foreign Application Priority Data

Feb. 17, 2011  (JP) ................. 2011-032558

(51) Int. Cl.
*A63F 13/00* (2014.01)
*A63F 13/63* (2014.01)
(Continued)

(52) U.S. Cl.
CPC .............. *A63F 13/63* (2014.09); *A63F 13/00* (2013.01); *G07D 7/12* (2013.01); *G07F 17/3244* (2013.01)

(58) Field of Classification Search
CPC .... G06Q 20/10; G06Q 30/0239; G06Q 20/06; G07D 7/002; A63F 13/00
(Continued)

(56) References Cited

U.S. PATENT DOCUMENTS

2001/0020955 A1   9/2001  Nakagawa et al.
2002/0035552 A1*  3/2002  Tsubura ................. G06Q 20/06
                                                          705/412
(Continued)

FOREIGN PATENT DOCUMENTS

JP   2006-094877 A   4/2006
JP   2006-163755 A   6/2006
(Continued)

OTHER PUBLICATIONS

"Amazon launches Coins virtual currency" May 14, 2013, theguardian.com, 3 pages (Year: 2013).*
(Continued)

*Primary Examiner* — Shannon S Campbell
*Assistant Examiner* — Freda A. Nelson
(74) *Attorney, Agent, or Firm* — Howard & Howard Attorneys PLLC

(57) ABSTRACT

There is stored in a storage device a conversion coefficient for correcting the difference between payment methods with respect to the correlation between the unit for enumerating a consumption amount and monetary value and treating the consumption amount of monetary value of each payment method as an enumerated value in the same unit system. Obtained from a payment apparatus is consumption record data where the consumption amount of monetary consumption by a user is represented by the number of units for each payment method. Calculated is an enumerate value corresponding to the consumption amount of each payment method based on the consumption amount of each payment
(Continued)

method included in the consumption record data and the conversion coefficient. Based on the enumerated value obtained for each payment method and a predetermined unit price, calculated is a counter value to be charged from the first party to the second party.

10 Claims, 9 Drawing Sheets

(51) Int. Cl.
  *G07D 7/12* (2016.01)
  *G07F 17/32* (2006.01)
(58) Field of Classification Search
  USPC .................. 705/14.16, 400, 412; 463/25
  See application file for complete search history.

(56) References Cited

U.S. PATENT DOCUMENTS

| | | |
|---|---|---|
| 2006/0271423 A1 | 11/2006 | Hiranoya |
| 2007/0060386 A1 | 3/2007 | Yamagishi et al. |
| 2007/0162870 A1 | 7/2007 | Nakagawa et al. |
| 2008/0281692 A1* | 11/2008 | Zhang ................ G06Q 20/10 705/14.16 |
| 2011/0124405 A1* | 5/2011 | Okada ................ G07D 7/12 463/25 |

FOREIGN PATENT DOCUMENTS

| | | | |
|---|---|---|---|
| JP | 2007-79643 | A | 3/2007 |
| JP | 2007-334718 | A | 12/2007 |
| JP | 2007334718 | A * | 12/2007 |
| JP | 2007334718 | A1 * | 12/2007 |
| JP | 2008-114095 | A | 5/2008 |
| JP | 2008114095 | A * | 5/2008 |
| JP | 2008114095 | A1 * | 5/2008 |
| JP | 2008-257518 | A | 10/2008 |
| JP | 2010-527079 | A | 8/2010 |
| JP | 2010-187908 | A | 9/2010 |
| WO | 2004/066179 | A1 | 8/2004 |
| WO | 2008/141199 | A1 | 11/2008 |

OTHER PUBLICATIONS

Crook, Jordan; "Amazon Launches 'Amazon Coins' in Its First Move Into Virtual Currency, Targets Apps and Games on Kindle Fire" Feb. 5, 2013; thecrunch.com, 3 pages (Year: 2013).*
International Search Report (dated Mar. 13, 2012).
Japanese Office Action with English Translation—dated Nov. 26, 2013.
CN Notification to Grant Patent Right for Invention, Issue No. 2017032300442720, dated Apr. 19, 2017, 3 pages.

* cited by examiner

VALUE COMPUTING SYSTEM AND A STORAGE MEDIUM STORING A COMPUTER PROGRAM FOR VALUE COMPUTING

CROSS REFERENCE TO RELATED APPLICATION

This application is a national stage application of PCT/JP2011/080416, filed Dec. 28, 2011, which claims priority to Japanese Patent Application No. 2011-032558, filed Feb. 17, 2011, the disclosures of which are hereby incorporated by reference in their entirety.

TECHNICAL FIELD

The present invention relates to a system which is applied to a system where service is provided by a coalition of plural parties, and computes the value to be charged to a party as a receiver from a party as a provider providing at least a part of elements necessary for allowing a user to use the service.

BACKGROUND ART

From before, to a game machine for business use, which allows a user to play games with charge, applied is the payment method that the user is required the payment of game-play fee by coins (real currency), A credit number is issued depending on the number of coins inputted by the user, and monetary value corresponding to the game-play fee is collected from the user by making the user consume the credits. Namely, the consumption of game-play fee is generally managed by replacing the game-play fee with a value in the unit system where a value for one unit is bigger than a value for the minimum unit of the currency. In recent years, in addition to such payment method with cash, proposed is a game system for business use, which enables a payment of the game-play with virtual money (for example, see the patent documents 1 to 3). The monetary value means a value corresponding to the fee which is quantified in accordance with the currency unit. For example, if one piece of JPY 100 coin is replaced with one credit, the one credit has the monetary value of JPY 100.

Patent Literature: PTL1: JP-A-2008-257518, PTL2: JP-A-2007-79643 and PTL3: JP-A-2006-94877.

SUMMARY OF INVENTION

Technical Problem

As the business of providing service to a user with charge, there is a business model that, not one party prepares all of elements necessary for allowing a user to use the service, a party provides at least a part of the elements to the other party, and the party provided provides the service to the user, and the monetary value the user consumed is divided into the parties. In addition, in the field of game system for business use, there is a business model that, while an operator of a game facility prepares a game machine as hardware, a holder of content to be used at the game machine lends the content to the operator, and the operator pays to the holder the value for content use depending on the degree of use of the content by users.

By the way, the value that the operator pays for use of the service is calculated by such a method as the degree of use of the service is quantified by following a certain criterion, and the value calculated is multiplied by a predetermined unit price. For example, in a case of a service where a user is allowed to play a game with charge, the number of times the game is played is enumerated, based on the enumerated value the counter value is calculated. However, there is a case that an appropriate counter value cannot be set by such calculation method. As one example, there is a case where a variable charge is applied in order to recover its popularity in such a way that the game-play fee is set high while the popularity of the game is high, and is set lower when the popularity lowers behind a predetermined criterion. In this case, even if the game-play fee is marked down, the counter value which the operator should pay for one game-play does not change. Therefore, the income for the operator is weighed on unilaterally. Because of this, it is hard for the operator to drop a price in consideration of deterioration of his/her income.

In addition, even if the consumption amount of monetary value by the user is enumerated, instead of the value indicating the degree of use of the service such as the number of times played, and based on the value enumerated, a value to be paid by the operator is calculated, as mentioned above, in a case where the user can select either one of the payment method of game-play fee with cash or the payment method of game-play fee with virtual money, there is a possibility that some confusion occurs by a difference between those payment methods in the unit to be used for enumerating the consumption amount. For example, in a case of payment with cash, the minimum unit of enumerating the consumption amount is correlated to the monetary value, the number of digits for which is big in comparison with the minimum value of the currency. On the other hand, in a case of the unit for enumerating the consumption amount of virtual currency, the consumption amount is enumerated generally by the unit equivalent to the unit of the currency, in the light of making the virtual currency function similarly to the real currency. For example, if the enumeration unit of the virtual value is called a point, one Japanese yen is set so as to be correlated to one point. In this case, on the game machine side, as the consumption amount of monetary value by a user, there are the consumption amount which is enumerated by using the credit as the unit and the consumption amount which is enumerated by using the point of virtual money as the unit. The monetary value corresponding to the unit for enumeration is different between those unit systems. Accordingly, when the counter value is calculated by multiplying each consumption amount by the unit price, it is necessary to change the number of digits of the unit price depending on the payment method. Because of this, there is enhanced the risk that a mistake in calculation could be induced because of a mistake of the number of digits at the moment of setting the unit price.

The present invention is invented in light of the above mentioned matters. Then, one of the aims of the present invention is providing a value computing system and the like capable of calculating appropriately the value to be paid by a party who provides the service to the user to another party, relating to the provision of service. In addition, it is another aim of the present invention to provide a value computing system and the like, even if plural payment methods are prepared with respect to the consumption of monetary value by the user, and the correlation of the unit for calculating the consumption amount and the monetary value is different between the payment methods, capable of excluding the effect the difference has on the unit price setting to calculate the value appropriate for the consumption amount.

Solution to Problem

A value computing system according to the first embodiment of the present invention is a value computing system being applied to a service system in which at least a part of elements necessary for making a user use service are provided from a first party to a second party; a fee is charged the user for the service and the second party makes the user consume monetary value equivalent to the fee for the service via a predetermined payment apparatus; a counter value depending on the monetary value consumed by the user is charged from the first party to the second party; the payment apparatus is configured so as to enumerate a consumption amount of the monetary value by the user by following a predetermined unit; and a correlation between the service to be provided to the user and the consumption amount of the monetary value to be enumerated for use of the service by the payment apparatus is changeable, and calculating the counter value to be charged from the first party to the second party by using a computer, wherein the value computing system comprises: a consumption record data obtaining device which is adapted and configured to obtain from the payment apparatus, consumption record data including the consumption amount of monetary value enumerated for the use of the service by the payment apparatus, and a value determination device which is adapted and configured to determine the counter value to be charged from the first party to the second party, based on the consumption amount included in the consumption record data and a predetermined unit price.

Further, a storage medium storing a computer program according to the first embodiment of the present invention is a storage medium storing a computer program being applied to a service system in which at least a part of elements necessary for making a user use service are provided from a first party to a second party; a fee is charged the user for the service and the second party makes the user consume monetary value equivalent to the fee for the service via a predetermined payment apparatus; a counter value depending on the monetary value consumed by the user is charged from the first party to the second party; the payment apparatus is configured so as to enumerate a consumption amount of the monetary value by the user by following a predetermined unit; and a correlation between the service to be provided to the user and the consumption amount of the monetary value to be enumerated for use of the service by the payment apparatus is changeable, and being applied for calculating the counter value to be charged from the first party to the second party by using a computer, wherein the computer program makes the computer function as: a consumption record data obtaining device which is adapted and configured to obtain from the payment apparatus, consumption record data including the consumption amount of monetary value enumerated for the use of the service by the payment apparatus, and a value determination device which is adapted and configured to determine the counter value to be charged from the first party to the second party, based on the consumption amount included in the consumption record data and a predetermined unit price.

According to the value computing system and the like corresponding to the first embodiment, the payment apparatus obtains the consumption record data including the consumption amount of monetary value enumerated, and determines the counter value based on the consumption amount and a predetermined unit price. Accordingly, by executing the variable charge or the like, in a case that changed is the correlation between a service and the consumption amount of monetary value which the payment apparatus should enumerate as the use fee of the service, it is possible to calculate the counter value on which the change is reflected.

In the first embodiment of the present invention, the payment apparatus may include a payment device which is adapted and configured to make the user consume virtual money an amount of which is equivalent to the fee, as a payment device which makes the user consume monetary value equivalent to the fee of the service, the consumption record data obtaining device may be adapted and configured to obtain from the device apparatus, virtual money consumption record data where a consumption amount of the virtual money possessed by the user for the use of the service is enumerated by following a predetermined unit, and the value determination device may be adapted and configured to determined the counter value to be charged from the first party to the second party based on the consumption amount of the virtual money included in the virtual money consumption record data and the predetermined unit price. Thereby, the counter value is calculated depending on the amount of virtual money the user consumed. Accordingly, even if changed is the correlation between the service and the consumption amount of virtual money the payment apparatus should enumerate for a use of the service, it is possible to obtain an appropriate counter value matching the actual consumption amount of the virtual money.

A value computing system according to the second embodiment of the present invention is a value computing system being applied to a service system in which at least a part of elements necessary for making a user use service are provided from a first party to a second party; a fee is charged the user for the service and the second party makes the user consume monetary value equivalent to the fee for the service via a predetermined payment apparatus; a counter value depending on the monetary value consumed by the user is charged as a counter value for provision of the element from the first party to the second party; the payment apparatus is configured so that the user can select one of a plurality of payment methods which are different from each other in a correlation between a unit for enumerating a consumption amount and the monetary value, and calculating the counter value to be charged from the first party to the second party by using a computer, wherein the value computing system comprises: a consumption record data obtaining device which is adapted and configured to obtain from the payment apparatus, consumption record data where the consumption amount of the monetary value is represented by using the number of units for each payment method; a conversion coefficient storage device which is adapted and configured to correct the difference in the correlation between the unit for enumerating the consumption amount and the monetary value, and store a conversion coefficient for treating the consumption amount of the monetary value for each payment method as an enumerated value in a same unit system among the plurality of payment methods; an enumerated value calculation device which is adapted and configured to calculate the enumerated value corresponding to the consumption amount of each payment method, based on the consumption amount of each payment method included in the consumption record data and the conversion coefficient stored in the conversion coefficient storage device; and a value determination device which is adapted and configured to determine the counter value to be charged from the first party to the second party, based on the enumerated value of each payment method obtained by the enumerated value calculation device and a predetermined unit price.

Further, a computer program according to the second embodiment of the present invention is a computer program being applied to a service system in which at least a part of elements necessary for making a user use service are provided from a first party to a second party; a fee is charged the user for the service and the second party makes the user consume monetary value equivalent to the fee for the service via a predetermined payment apparatus; a counter value depending on the monetary value consumed by the user is charged as a counter value for provision of the elements from the first party to the second party; the payment apparatus is configured so that the user can select one of a plurality of payment methods which are different from each other in a correlation between a unit for enumerating a consumption amount and the monetary value, and being applied for calculating the counter value to be charged from the first party to the second party by using a computer, wherein the computer program makes the computer function as: a consumption record data obtaining device which is adapted and configured to obtain from the payment apparatus, consumption record data where the consumption amount of the monetary value is represented by using the number of units for each payment method; a conversion coefficient storage device which is adapted and configured to correct the difference in the correlation between the unit for enumerating the consumption amount and the monetary value, and store a conversion coefficient for treating the consumption amount of the monetary value for each payment method as an enumerated value in a same unit system among the plurality of payment methods; an enumerated value calculation device which is adapted and configured to calculate the enumerated value corresponding to the consumption amount of each payment method, based on the consumption amount of each payment method included in the consumption record data and the conversion coefficient stored in the conversion coefficient storage device; and a value determination device which is adapted and configured to determine the counter value to be charged from the first party to the second party, based on the enumerated value of each payment method obtained by the enumerated value calculation device and a predetermined unit price.

According to the value computing system of the second embodiment, the conversion coefficient is introduced for treating the consumption amount of monetary value of each payment method as the enumerate value in the same unit system, and by replacing the consumption amount enumerated for each payment method with the enumerated value in the same unit system, the counter value is calculated using each enumerated value and the unit price. Therefore, it is possible to calculate the counter value appropriate for the consumption amount while excluding an effect the difference in the correlation between the unit for enumerating the consumption amount and the monetary value has on the unit price setting.

In the second embodiment of the present invention, a first payment method and a second payment method may be prepared as the plurality of payment methods, the unit for enumerating the consumption amount by the first payment method may be correlated to the monetary value which is bigger in the number of digits thereof than the monetary value to which the unit for enumerating the consumption amount by the second payment method, and the conversion coefficient may be set so as to equalize in the number of digits the consumption amount to be enumerated by following a unit system of the first payment method to the consumption amount to be enumerated by following a unit system of the second payment method. Thereby, even if there is a difference in the number of digits with respect to the correlation between the unit for enumerating the consumption amount and the monetary value, it is not necessary to reflect the difference in the number of digits on the unit price setting.

The first and the second payment methods may be configured depending on the situation. As one example, the first payment method may be a payment method with cash, and the second payment method may be a payment method with virtual money. Thereby, even if the unit for enumerating the consumption amount under the cash payment is correlated to the monetary value which has bigger number of digits than the monetary value the unit for enumerating the consumption amount under virtual money payment, it is possible to correct the difference in the number of digits by the conversion coefficient to obtain the counter value corresponding to each consumption amount. For example, even if it is selectable whether the credits are consumed or the virtual money is consumed at a game machine for business use, it is possible to exclude an effect the difference in the unit system has on the unit price setting.

With respect to the second embodiment of the present invention, a plurality of kinds of services may be available to be used by the user, and the enumerated value calculation device may calculate the enumerated value by multiplying the consumption amount by a multiplying factor set depending on content of the service and the conversion coefficient. In this case, by using the multiplying factor, it is possible to reflect the value of service, development costs, and the like on the calculation of the counter value.

Further, the service may be used by the user via a physical apparatus the second party operates, a content which is used at the physical apparatus may be provided from the first party to the second party as the element, and a use fee for the content may be charged as the counter value from the first party to the second party. Further, the physical apparatus may be a game machine for business use. Thereby, it is possible to lower the risk such as a mistake in calculation at the moment when calculated is the counter value for the use of content such as a game machine.

DESCRIPTION OF EMBODIMENTS

Figure 1:
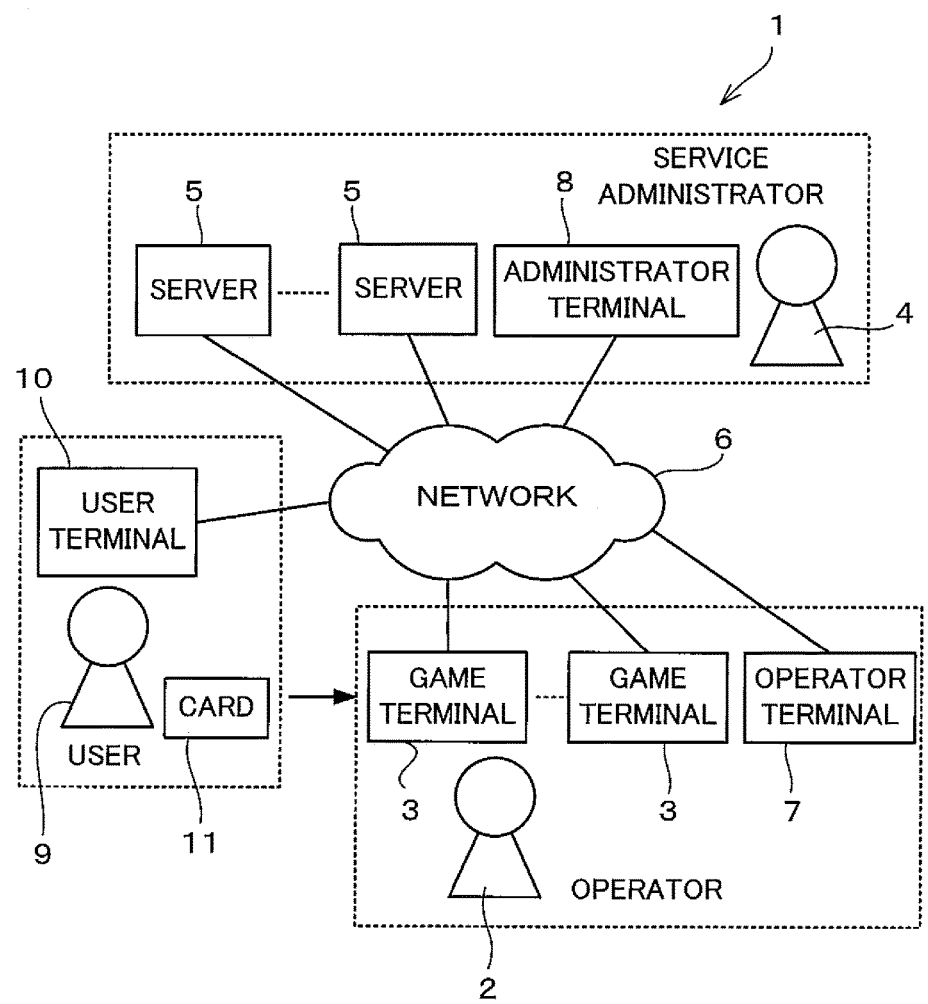
FIG. 1 is a diagram showing a whole configuration of an amusement system as one example of a service system to which the present invention is applied.

Hereinafter, one embodiment of the present invention will be explained, referring to drawings attached. The present embodiment is an example where a value computing system of the present invention is applied to an amusement system which is operated commercially. FIG. 1 shows the outline of the amusement system. In the amusement system 1 illustrated, one or plural game terminal(s) 3 and a plurality of sever apparatuses (hereinafter, abbreviated as the server) 5 administered or operated by a service administrator 4 are connected to each other via a network 6 such as the internet, the game terminal(s) 3 being installed by an operator 2 to a commercial facility such as an amusement facility (hereinafter, referred to as a store). To the network 6, an operator terminal 7 which is used by the operator 2, an administrator terminal 8 which is used by the service administrator 4, and a user terminal 10 which is used by the user 9 are also connected. The user 9 is a player of a game. The game machine 3 is a game machine for business use permits, in exchange for consuming a predetermined amount of monetary value as the game-play fee, the user to play the game within a range consumed. Each of the operator terminal 7 and the administrator terminal 8 is preferably a personal computer having a function for connecting to a network. As the user terminal 10, a personal computer, a portable terminal (for example, a portable phone) or the like which is operated by the user 9, can be used depending on the situation. The game terminal 3 and the operator terminal 7 which are installed into the store, are communicably connected to each other by a store LAN not illustrated. On the other hand, each server 5 and the administrator 8 are also communicably connected to each other via a LAN or a WAN.

In the amusement system 1, the user 9 can use, for example, a card 11 as a medium having information memory device such as an IC chip. In the information memory device of the card 11, a card ID as a medium ID unique for each card 11 is electronically memorized. In addition, a card number is memorized at an appropriate place such as the rear face of the card 11, the card number being obtained by decoding the card number into alphanumeric characters. The card number and the card ID have a codec relation to each other, and each functions as the medium ID. The card 11 is issued by the service administrator 4, and distributed from the service administrator 4 to the user 9 directly, or via the operator 2. As one example, the card 11 is provided to the user 9 by a card vending machine (not illustrated) installed by the operator 2, or provided from the game terminal 3 to the user 9. In the card terminal 3, mounted is a card reader (omitted in FIG. 1) for reading out the card ID from the card 11.

In the amusement system 1, also mounted is a system which provides various kinds of services to each of the operator 2 and the user 9. For example, in a case that the user 9 makes the game terminal 3 recognize the card ID of the card 11 to play the game, game-play data including his/her score and the like relating to the game is generated at the game terminal 3, the game-play data is transmitted to the server 5 with the card ID and stored. The game-play data stored by the server 5 can be used at the next time or later game-play opportunity. For example, in a case the user 9 plays the same game again, by making the card reader of the game terminal 3 recognize the card ID of the card 11 prior to the game-play, it is possible to read out from the server 5 into the game terminal 3, the game-play data stored in association with the card ID recognized, and use the game-play data. Alternatively, in a case that it is possible to play a battle game via the network 6 at the game terminal 3, provided to the user 9 is a service that the server 5 combines users 9 as opponents based on the game-play data stored in association with each user 9, the user 9 having accessed the server 5 within a predetermined time to apply the battle. Moreover, to the amusement system 1, mounted is a fee payment function which enables that the user 9 opens an account of virtual money at the server 5, the user deposits (or charges) the virtual money into the account, and the user 9 is made to consume (withdraw) from the account, the virtual money the amount (the value) of which is equivalent to the game-play fee. However, it is possible to pay the game-play fee, not only by virtual money, but also by coins (the real currency).

Further, in the amusement system 1, as necessary elements for allowing the user 9 to use various kinds of services, various kinds of hardware and software are prepared. At least one part of the elements are transferred or lent from the service administrator 4 to the operator 2. As one example, the game terminal 3 is transferred from the service administrator 4 to the operator 2 with charge. On the other hand, at least a part of so-called contents to be used at the game terminal 3, such as a game program or data, are lent (provided from the service administrator 4 to the operator 2. When the user 9 plays the game, the operator 2 collects the game-play fee as the use fee of service. On the other hand, the service administrator 4 charges a fee on the operator 2 as the counter value of lending the content, depending on the game-play fee the user 9 paid, that is, the monetary value the user 9 consumed when playing the game. Hereinafter, the fee charged as the counter value of the content is sometimes referred to as the content use fee. Hereinafter, explanation will be continued, using as an example a case that the present invention is applied with respect to the calculation of the content use fee.

Figure 2:
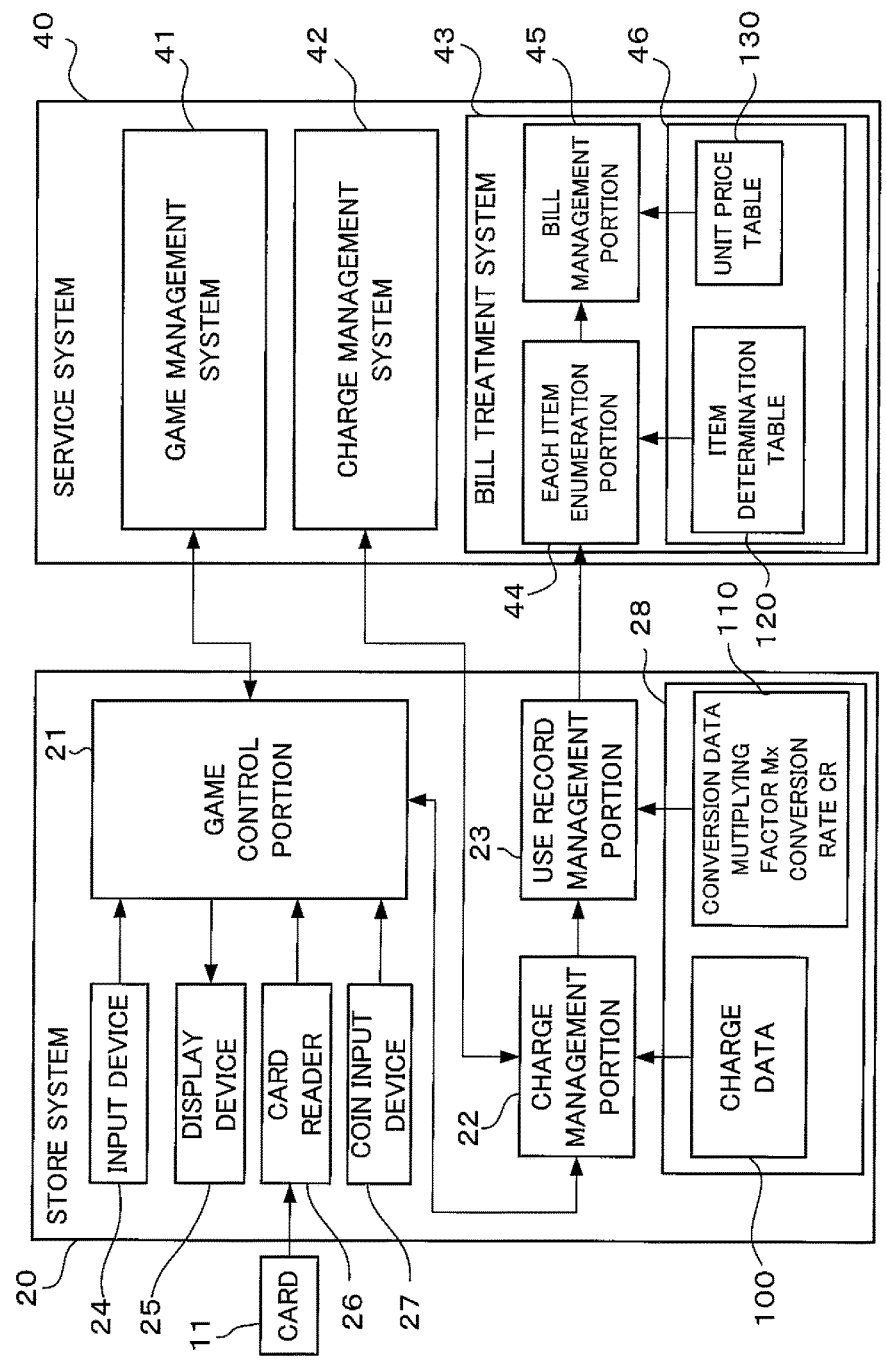
FIG. 2 is a functional block diagram of the major part of the amusement system.

FIG. 2 is a functional block diagram of the amusement system 1. However, in FIG. 2, a part relating to the calculation of the mentioned content use fee is shown as a major part, and the other part is shown in a simplified manner, or the illustration of the part is omitted. Further, the illustration of the part corresponding to the access from the user terminal 10 to the server 5 is omitted. As shown in FIG. 2, the amusement system 1 can be divided into a store system 20 and a service system 40. The store system 20 includes the game terminal 3 and the operator terminal 7 which are shown in FIG. 1, and the service system 40 includes the server 5 and the administrator terminal 8 which are shown in FIG. 1.

The store system 20 is provided with a game control portion 21, a charge management portion 22 and a use record management portion 23. The game control portion 21 is a logical device realized by combining computer hardware and predetermined software of the game machine 3. In other words, the game control portion 21 is a logical device which is configured by making a computer unit of each game terminal 3 implement predetermined software. The game control portion 21 is in charge of various kinds of calculations and input-output processing which are necessary for playing a predetermined game at the game terminal 3. With the game control portion 21, an input device 24, a display device 25, a card reader 26 and a coin input device 27, which are provided to the game terminal 3, are connected. The input device 24 accepts operations by the user 9, and outputs the signal to the game control portion 21 depending on the content of operation. The display device 25 displays a game image and the like by following indications from the game control portion 21. The card reader 26 reads out the information (including the card ID) of the card 11 possessed by the user 9, and out puts the signal corresponding to the information to the game control portion 21. The coin input device 27 accepts the input of a predetermined value of coins (real cash) by the user 9, and determines whether the coins are true or false. Further, the coin input device 27 outputs to the game control portion 21, the signal depending on the number (the value) of true coins inputted.

The charge management portion 22 is a logical device which is provided for managing the charge of game-play on the user 9. The charge management portion 22 may be configured as a logical device which is realized by combining computer hardware and predetermined software of either one of the game terminal 3 or the operator terminal 7, or may be configured as a logical device which is realized by combining computer hardware and predetermined software of both of the game terminal 3 and the operator terminal 7. When receiving information relating to the charge of game play from the game control portion 21, the charge management portion 22 implements, independently or in cooperation with the service system 4, the processing necessary for making the user 9 consume the monetary value equivalent to the game-play fee, with reference to charge data 100 stored in a storage device 28 of the store system 20, and notifies the game control portion 21 whether or not it should be permitted to play the game depending on whether or not the consumption is successful. Further, in a case that the consumption of the monetary value equivalent to the game-play fee is successful, the charge management portion 22 generates charge record data depending on the consumption result. The charge record data corresponds to consumption record data of the present invention. The details of processing implemented by the charge management portion 22 will be described later.

The use record management portion 23 is a logical device which is provided for calculating the mentioned content use fee. The use record management portion 23 may be configured as a logical device which is realized by combining computer hardware and predetermined software of either one of the game terminal 3 or the operator terminal 7, or may be configured as a logical device which is realized by combining computer hardware and predetermined software of both of the game terminal 3 and the operator terminal 7. The use record management portion 23 obtains the charge record data of the game-play fee from the charge management portion 22, and implements independently or in cooperation with the service system 40, processing necessary for calculating the content use fee with reference to conversion data 110 stored in the storage device 28. The details of processing implemented by the use record management portion 23 will be described later.

The service system 40 is provided with a game management system 41, a charge management system 42, and a bill treatment system 43. These systems 41 to 43 are logical devices which are realized by combining computer hardware and predetermined software which are included in the service system 40. As the computer hardware of the service system 40, a computer unit of each server 5 and a computer unit of the administrator terminal 8 may be applied independently, or may be applied by combining them depending on the situation. The game management system 41 implements processing for configuring environment for implementing a game at the game terminal 3 in cooperation with the game control portion 21 of the store system 20. For example, in response to a request from the game control portion 21, the game management system 41 implements processing such as transmission, reception, storage, and update of the play data corresponding to the card ID, and combination of opponents. Further, the game management system 41 may be in charge of the processing necessary for realizing service for the operator 2 such as update of a game program and data of the game terminal 3.

The charge management system 42 implements processing necessary for consumption of virtual money in cooperation with the charge management portion 22 of the store system 20. For example, when receiving the card ID and the requested withdrawal value (requested consumption amount) of virtual money from the charge management portion 22, the charge management system 42 specifies the account of virtual money correlated to the care ID, and attempts to consume from the account the virtual money the amount of which is equivalent to the requested amount. Then, the charge management system 42 notifies the charge management portion 22 whether the consumption is successful or not. However, the processing of consuming the virtual value is not limited to the example where the service system 40 is used, and can be varied depending on the situation. For example, in a case that the balance of virtual money is memorized not in the account of the server 5, but in a medium of the card 11 possessed by the user 9, the charge management portion 22 may be configured so as to access the medium of the card 11 via the game control portion 21 and the card reader 26, and implement processing for subtracting the virtual value the amount of which is equivalent to the game-play fee from the balance memorized in the medium. Besides that, with respect to the withdrawal processing of virtual money, the processing may be varied appropriately depending on the various kinds of payment methods for virtual money, which is used in the market as the so-called pre-paid type or post-paid type.

The bill treatment system 43 implements processing necessary for calculating the content use fee in cooperation with the use record management portion 23 of the store system 20. The bill treatment system 43 is further provided with an each-item enumeration portion 44 and a bill management portion 45 as logical devices. In addition, the service system 40 is provided with a storage device 46. In the storage device 46, stored are an item determination table 120 and a unit price table 130 which should be referred to in the processing of the each-item enumeration device 44 and the bill management portion 45 respectively. The details of them will be described later.

As is clear from the above explanation, in the amusement system 1, as the method of making the user 9 consume monetary value equivalent to the game-play fee, there are two kinds of methods, one is the payment method using coins (cash) and another is the payment method using virtual money. The monetary value of the game-play fee is represented generally by the currency unit. However, in the game machine 3, the monetary value is enumerated, not by the currency unit, by a unit system different for each payment method, and the user 9 is made to consume the monetary value equivalent to the game-play fee by following each unit system. The consumption amount of the monetary value is converted into a billing count value of the same unit system, and based on the billing count value, calculated is the billing amount of the content use fee billing from the service administrator 4 to the operator 2. The billing amount of the content use fee is calculated by following the currency unit. Hereinafter, referring to an example shown in FIG. 3, will be described a basic relation between the consumption of game-play fee by coins or virtual money and the calculation of the content use fee. Here, as one unit for which the game-play fee is charged on the user 9, the conception of "game event" is used. Namely, it is assumed that a predetermined value of game play fee is charged for one game event. In other words, one game event is one piece of content which is an objective for which the service administrator 4 charges the operator 2. The game event may be divided by following various kinds of criteria. For example, the game event may be sectionalized depending on game-play time of the game, or may be sectionalized depending on various kinds of sections such as a stage, a turn, a mode and the like. The game event may be sectionalized between the first game-play and the successive game-play.

Figure 3:
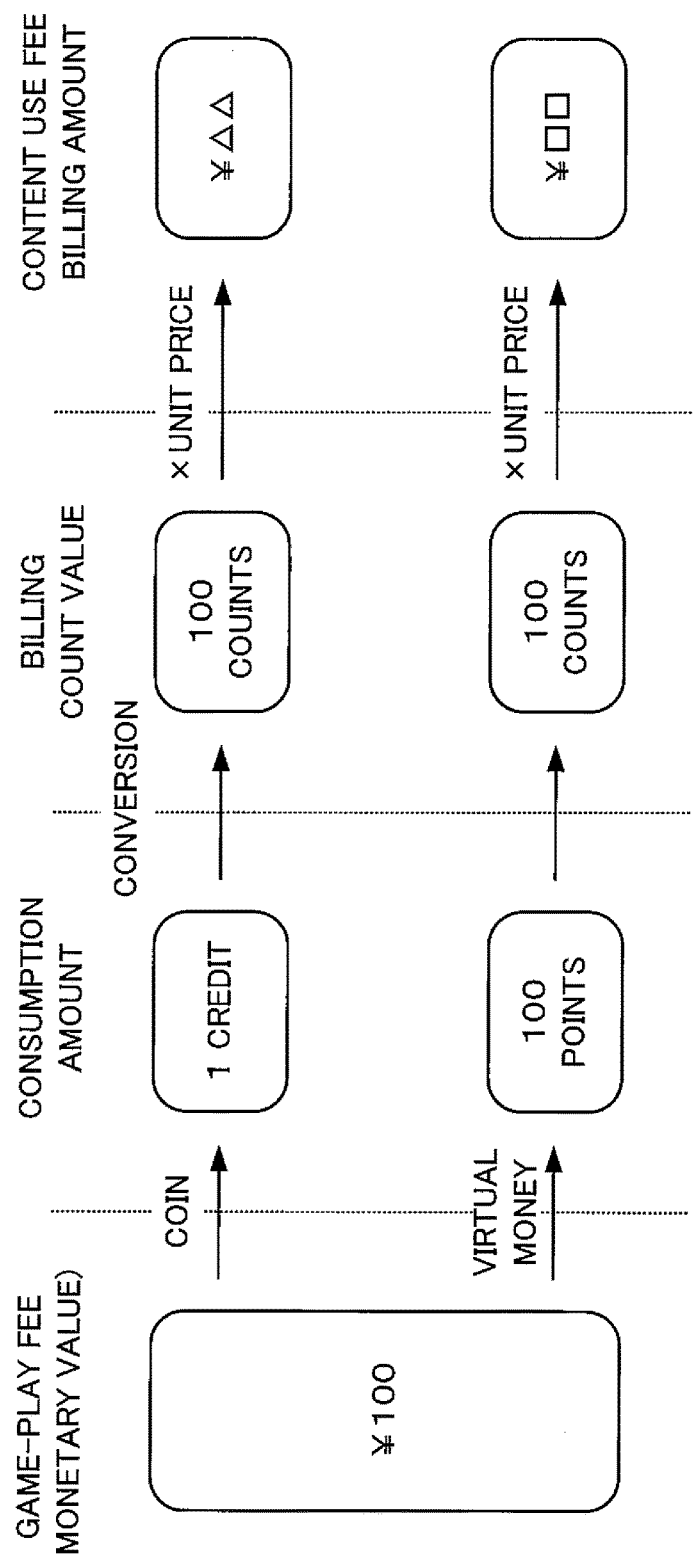
FIG. 3 is a diagram showing basic conception of a conversion process of unit system to be used from the consumption of game-play fee to the calculation of a fee for using content.

In the example shown in FIG. 3, it is assumed that the game-play fee charged for a given game event is JPY 100. When the user 9 inputs a predetermined value of coins into the coin input device 27, the number of coins is enumerated by the coin input device 27, and the value of "credit" according to the number of coins is recorded as the monetary value to be possessed by the user 9. As one example, in a case that one piece of JPY 100 coin is inputted, one credit is recorded. Then, when the user 9 indicates the consumption of one credit to the game terminal 3, at the game terminal 3, it is recognized that the monetary value equivalent to JPY 100 has been consumed, and it is permitted to play the game event corresponding to the consumption amount. Namely, in a case that the game-play fee is paid with coins, the monetary value is enumerated based on one credit as the minimum unit. On the other hand, in a case that the user 9 pays the game-play fee with virtual money, the monetary value possessed by the user 9 is enumerated based on a smaller unit than "credit", and the virtual money, the amount of which is equivalent to the game-play fee is consumed. In a case that the unit for enumerating the amount (or the value) of virtual money is "point", in the example shown in FIG. 3, one point is set so as to be equal to one Japanese yen. Accordingly, in a case that JPY 100 game-play fee is needed, 100 points of virtual money are consumed. Although it is not necessary that one point is always correlated to JPY one, one point (that is, the consumption unit of virtual money) is set so as to be equivalent to one digit smaller monetary value or much smaller than one credit.

As mentioned above, the following is one of reasons why the number of digits for the unit for enumerating the consumption amount is different between the payment method with coins and the payment method with virtual money. First, the coin input device 27 of the game terminal 3 is configured so as to accept, because of some mechanical restriction, only coins the number of digits for which is bigger than the minimum unit of currency. For example, the coin input device 27 can accept only the JPY 100 coin, or the JPY 100 coin and the JPY 500 coin, but the coins the value of which is smaller than JPY 100 are not enumerated, and returned to the user 9. Because of this, an apparent correlation is set, so that by setting the number of digits for the unit of enumerating the consumption amount equally to the number of digits for the number of coins, one credit is held by input of one coin and it is permitted to play one time of game in exchange of the consumption of one credit. On the other hand, with respect to the virtual money, as the mechanical restriction like the coin input device 27 does not exist, it is possible to correlate easily the unit for enumerating the consumption amount to monetary value the number of digits for which is smaller, in comparison with the number of digits for the case of the coins. For example, by correlating one Japanese yen to one point, it is possible to set, as the minimum unit of the consumption amount, small monetary value equivalent to one Japanese yen. Thereby, enabled is the flexible fee setting, which is impossible in the case of the payment method for game-play by coins. For example, it is possible to set such situation as there is prepared a game event the one game-play of which is equivalent to JPY 10, and it is permitted to play the game event in exchange of the consumption of 10 pints of virtual money. In addition, when the user 9 wants to continue playing the game at the moment of finishing one time of the game event, in a case of using the payment method with coins, the game event can be continued only in units of the consumption of credit, that is, in units of the consumption of monetary value equivalent to JPY 100. In this case, it is necessary to set, in units of also equivalent to JPY 100, the game-play range (which can be set by following a quantificable conception, such as time) of the game event to be continued. While, in a case of consuming the virtual money, it is possible to set the game-play range of the successive game event in smaller unit such as JPY 10.

When the credits or the points are consumed, the content use fee is calculated based on the consumption amount thereof. However, in the above example, between the case that the payment with coins is selected and the case that the payment with virtual money is selected, the consumption amount (the number of consumption units) corresponding to the same value of monetary value is different by two-digit number. Accordingly, the consumption amount of credit, the number of digits for which is small, is multiplied by a predetermined conversion coefficient, so that the number of digits for the consumption amount becomes equal between the two payment methods. The value after the conversion is the billing count value. Hereinafter, the unit for the billing count value is called the "count". In the example shown in FIG. 3, one credit is converted into 100 counts of the billing count value by the multiplication of the conversion coefficient 100.

On the other hand, 100 points are converted into 100 counts of the billing count value, as it is. After that, by multiplying the obtained billing count value by a predetermined unit price, the billing amount of the content use fees, "¥ΔΔ", "¥□□" are calculated. Additionally, FIG. 3 shows only one example, and is possible to be changed depending on the situation.

For example, the currency unit to be used for the enumeration of monetary value is not always Japanese yen. The monetary value may be enumerated based on various kinds of currency units such as dollar, euro, and the like. The value of game-play fee corresponding to the game event can be also varied appropriately depending on the situation. The payment method with coins and the payment method with virtual money may coincide with each other, or may differ from each other, in the unit price to be used for calculating the content use fee.

Figure 4:
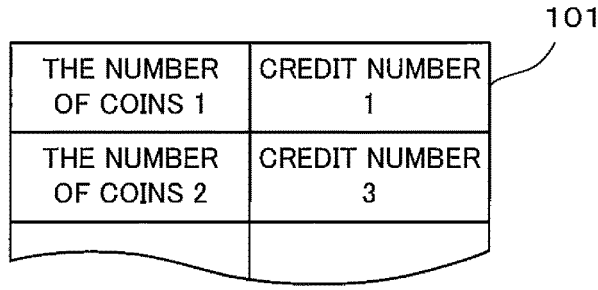
FIG. 4 is a diagram showing one example of a credit setting table.
Figure 5:
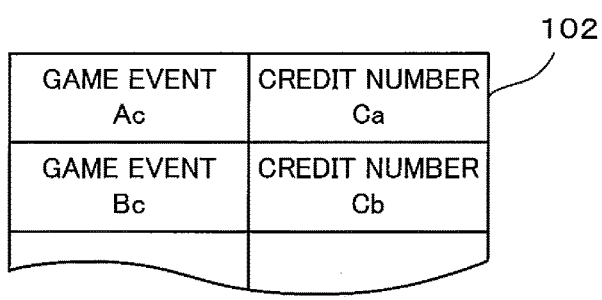
FIG. 5 is a diagram showing one example of a consumption amount of credit table.
Figure 6:
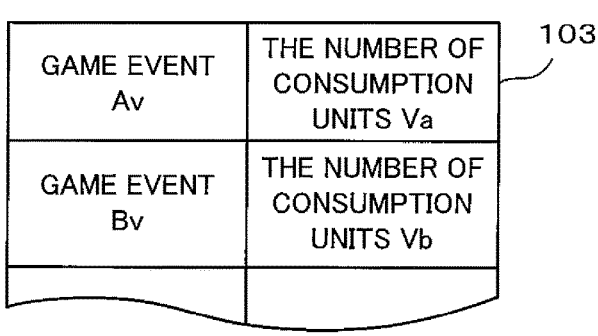
FIG. 6 is a diagram showing one example of a consumption amount of virtual money table.

Next, referring to FIGS. 4 to 7, will be explained the data stored in the storage device 28 of the store system 29. FIG. 4 shows a credit setting table 101, FIG. 5 shows a consumption amount of credit table 102, and FIG. 6 shows a consumption amount of virtual money table 103. The tables 101 to 103 shown in FIGS. 4 to 6 are included in the charge data 100. The credit setting table 101 in FIG. 4 is a table where the number of coins is correlated to the number of credits (the credit number) with respect to a predetermined value (for example, JPY 100). In the example of FIG. 4, the correlation is set as following: when the user 9 inputs one coin, one credit issues, and when the user 9 inputs two coins, three credits issue. When the signal indicting coin input is outputted from the coin input device 27, the game control portion 21 notifies the charge management portion 22 of the number of inputted coins. The charge management portion 22, referring to the credit setting table 101, issues the credit number which corresponds to the number of inputted coins. The credit number is held in the storage device 28 of the store system 20.

The consumption amount of credit table 102 shown in FIG. 2 is a table where each game event is correlated to the consumption amount (the consumption number) of credit which is required for the game-play of the game event. For example, it is required to consume the credit number Ca for playing the game event Ac, and it is required to consume the credit number Cb for playing the game event Bc. The tables 101, 102 shown in FIGS. 4 and 5 are data table to be used in a case the game-play fee is paid with cash. By referring to the correlation between those tables 101, 102, specified is the monetary value to be consumed by the user 9 via the credit in exchange of the game-play.

On the other hand, the consumption amount of virtual money table 103 is a data table to be used in a case that the game-play fee is paid with virtual money. In the consumption amount of virtual money table 103, each game event is correlated to the number of consumption units (the consumption amount) of virtual money required to play the game event. For example, it is required to consume the number of points Va of virtual money for playing the game event Av, and it is required to consume the number of points Vb for playing the game event Bv. In addition, the set values of the credit number in FIGS. 4 and 5, and the set values of the number of consumption units of virtual value can be varied depending on the situation by the operator 2. By varying the credit number in FIG. 5, under a case of paying the game-play fee with coins, the correlation between the game-play range and the game-play fee is varied. While, by varying the number of consumption units in FIG. 6, under a case of paying the game-play fee with virtual money, the correlation between the game-play range and the game-play fee is varied. Namely, by varying the credit number in FIG. 5, or the number of consumption units in FIG. 6, enabled is a variable charge relating to the game-play fee.

In FIGS. 5 and 6, the index "C" is given to the game event which is available to be played in exchange of the consumption of credits, and the index "v" is given to the game event which is available to be played in exchange of the consumption of virtual money. However, each game event may be available to be played by allowing the user 9 to select the credit or the virtual money to be consumed, or may be available to be played by only one payment method, either one of the consumption of credit or the consumption of virtual money. In addition, with respect to the game event which becomes available to be played in exchange of the consumption of virtual money, by setting comparatively smaller number of consumption units for virtual money, smaller game-play range (time, content) of the game event may be set than the game-play range of the game event which is available to be played in exchange of the consumption of credits. In this case, it is possible to configure a system so that, by subdividing the game-play range which is available to be played in exchange of the consumption of one credit, and by consuming virtual money plural times, a part or all of the game-play range can be played. Further, the number of consumption units shown in FIG. 6 may be the minimum value necessary for playing the game event. In a case that virtual money the amount of which exceeds the minimum value is consumed, the game-play range of the game event may be expanded according to a difference between the minimum value and the consumption amount.

Figure 7:
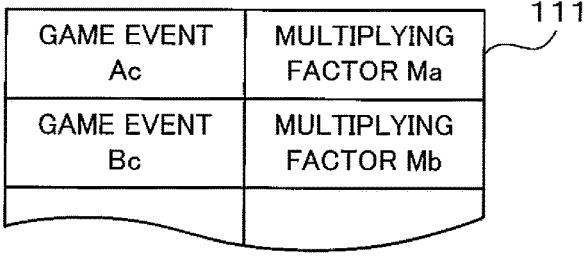
FIG. 7 is a diagram showing one example of a multiplying factor table.

FIG. 7 shows a multiplying factor table 111 included in the conversion data 110. The multiplying factor table 111 is data table where the correlation between each game event and the multiplying factor Mx (refer to the conversion data 110 shown in FIG. 2) is recorded. For example, the multiplying factor Ma and the multiplying factor Mb are correlated to the game event Ac and the game event Bc respectively. The multiplying factor Mx shown in FIG. 2 means a multiplying factor correlated to an arbitrary game event Xc. The multiplying factor in this embodiment is a value set so as to, when the service administrator 4 charges the operator 2 the content use fee as a counter value, increase or decrease the counter value depending on the value of game event. In other words, the multiplying factor Mx is set in order for the service administrator 4 to control the rate (a counter value rate) of content use fee depending on the content of game event. As one example, with respect to a game event the value of which is standard, the multiplying factor Mx is set to a standard value 1. When the service administrator 4 wants to make the counter value of a game event bigger than a standard value, the multiplying factor Mx correlated to the game event is made bigger than the standard value. FIG. 7 shows only the relation between the game event correlated to the consumption of credits and the multiplying factor Mx. However, the multiplying factor Mx may be also appropriately set for the game event correlated to the consumption of virtual money.

Returning to FIG. 2, in the conversion data 110, besides the mentioned multiplying factor Mx, data of conversion rate CR is also recorded. The conversion rate CR is a coefficient for converting the consumption amount of credit into the billing count value. In the example shown in FIG. 3, if the multiplying rate Mx is "1", the conversion rate CR is 100. Both of the multiplying factor Mx and the conversion rate CR are set by the service administer 4, and both of them are impossible to be changed arbitrarily by the operator 2.

Figure 8:
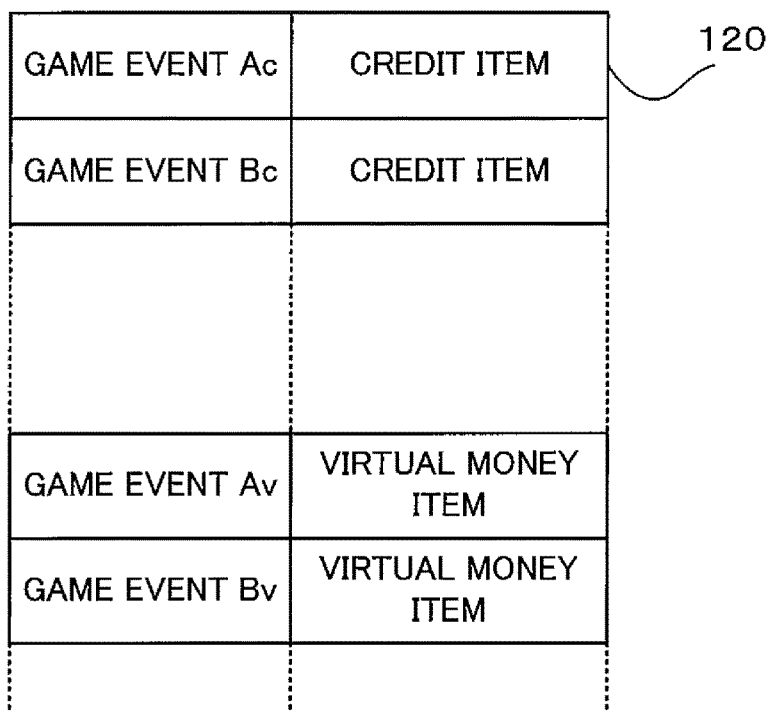
FIG. 8 is a diagram showing one example of an item determination table.
Figure 9:
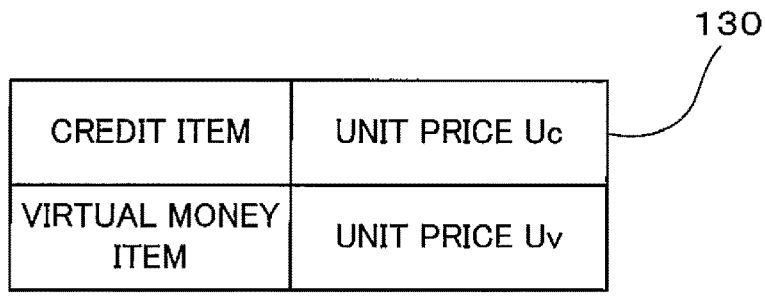
FIG. 9 is a diagram showing one example of a unit price table.

Next, referring to FIGS. 8 and 9, will be explained data recorded in the storage device 46 of the service system 40. FIG. 8 shows one example of the item determination table 120, and FIG. 9 shows one example of the unit price table 130. The item determination table 120 in FIG. 8 is a data table where the correlation between each game event and an item is recorded. The item is either one of a credit item or a virtual money item. It is permitted to play the credit item in exchange of the consumption of credit, and permitted to play the virtual money item in exchange of the consumption of virtual money. The unit price table 130 in FIG. 9 is a data table where the correlation between each item and the unit price is recorded. The unit price Uc is correlated to the credit item, and the unit price Uv is correlated to the virtual money item. The unit price Uc and the unit price Uv may equalize each other, or may differs from each other. However, the number of digits for the unit price Uc is equal to the number of digits for the unit price Uv. In other words, the conversion rate CR of the conversion data 110 is set so that the number of digits of the unit prices Uc, Uv are equalized to each other.

Next, will be explained processing which is, in relation to the calculation of the content use fee, implemented by the store system 20 and the service system 40 shown in FIG. 2.

Figure 10:
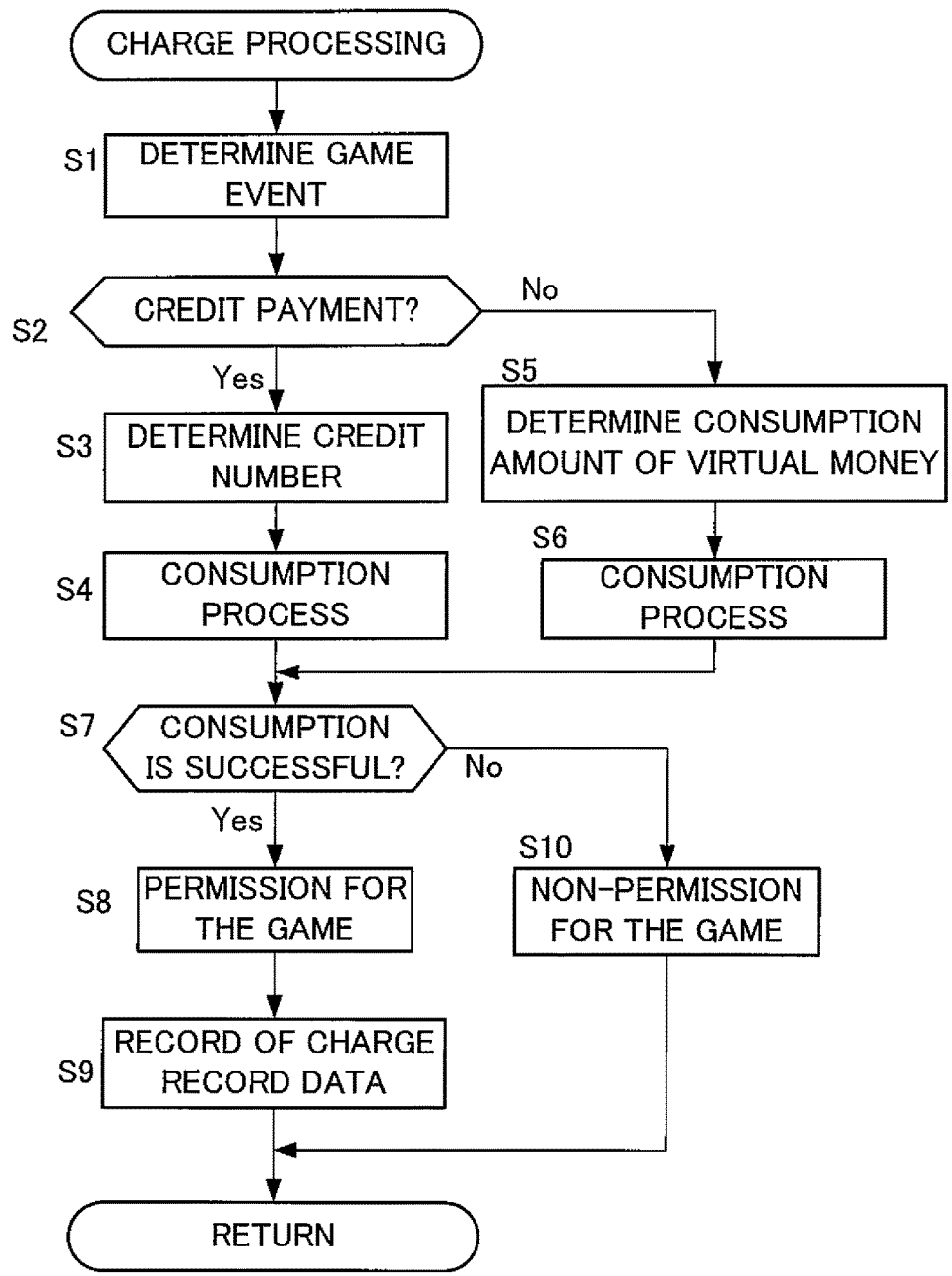
FIG. 10 is a flow chart showing a charge processing routine which is implemented by a charge management portion.

FIG. 10 shows a charge processing routine which the charge management portion 22 implements in order to make the user 9 consume the monetary value possessed by the user 9 when the user 9 plays the game. When the user 9 operates the input device 24 to select one of game event, the game control portion 21 provides charge request information including information indicating the game event selected to the charge management portion 22. In response to this, the charge management portion 22 starts the routine shown in FIG. 10. First, at step S1, the charge management portion 22 determines the game event selected by the user 9 and at successive step S2, it is determined whether or not the game-play fee should be paid with the credit. With respect to the game event selected by the user 9, in a case that it is possible to select the credit payment or the virtual money payment to pay the game-play fee, the charge management portion 22 may make the user 9 select either one of the payment methods via the game control portion 21, and may determine the selection result at step S2. In a case that only one payment method, that is, only one of the payment method with credit or the payment method with virtual money, is available for the game event selected, the charge management portion 22 determines the payment method available at step S2.

In a case that the credit payment has been determined at step S2, the charge management portion 22 goes to step S3, and, referring to the consumption amount of credit table 102 (FIG. 5), determines the credit number which the user 9 should consume for playing the game event. For example, in a case of the game event Ac, the consumption number of required credits is Ca. At successive step S4, the charge management portion 22 implements a process of consuming the credits, the number of which has been determined at step S3. The process is implemented by subtracting the consumption number from the credit number already held. The subtraction may be implemented by following indications from the user 9, or may be implemented automatically without indications from the user 9. In a case that the held credit number runs short, the user 9 may be made to input the deficient number of coins or more.

On the other hand, in a case that the credit payment has not been determined, that is, in a case that it is determined that the payment has been determined by virtual money, the charge management portion 22 goes to step S5 to refer to the consumption amount of virtual money table 103 (FIG. 6) and determine the minimum value of the consumption amount (the number of points) of virtual money the user 9 should consume for playing the game event. For example, in a case of the game event Av, it is determined that the minimum value of required consumption amount of virtual money is Va. Successively at step S6, the charge management portion 22 implements processing for making the user 9 consume the virtual money the amount of which has been determined at step S5. In this case, the charge management portion 22 transmits the card ID and the consumption amount of virtual money to the charge management system 42 of the service system 40 to make a request for a withdrawal of the virtual money from the account corresponding to the card ID, and receives a reply to the request.

After implementing the consumption process at step s4 or step S5, the charge management portion 22 goes to step S7 to determine whether or not the consumption is successful. In a case of the credit payment, it is determined whether or not the consumption of required credit number is successful at step S4. In a case of the virtual money payment, it is determined whether or not the consumption of virtual money is successful by referring to the notice from the charge management system 42 which has been obtained at step S6. In a case that it is determined the consumption is successful, the charge management portion 22 goes to step S8 to notify the game control portion 21 of permission for the game. After completing the process of step S8, the charge management portion 22 goes to step S9 to record in the charge record data, the game event and the consumption result of the game-play fee thereof. After that, the charge management portion 22 terminates the charge processing routine of this time. While, in a case that it is determined that the consumption has not been successful at step S7, the charge management portion 22 goes to step S10 to notify the game control portion 21 of non-permission for the game. After that, the charge management portion 22 terminates the routine of this time. In addition, in a case that the permission for the game has been reported at step S8, the game control portion 21 continues to implement the process for making the user 9 play the game event selected. In a case that the non-permission for the game has been reported at step S10, the game control portion 21 implements a process necessary for forbidding the user 9 to play the game event. By repeating the mentioned processing, in the charge record data, each time it is permitted to play a game event, a record corresponding to the game event is accumulated successively, one set of record being constituted by the information for determining the game event the game-play of which is permitted and the information for determining the credit number or the number of points of virtual money, which is consumed as the counter value of the game-play of the game event.

Figure 11:
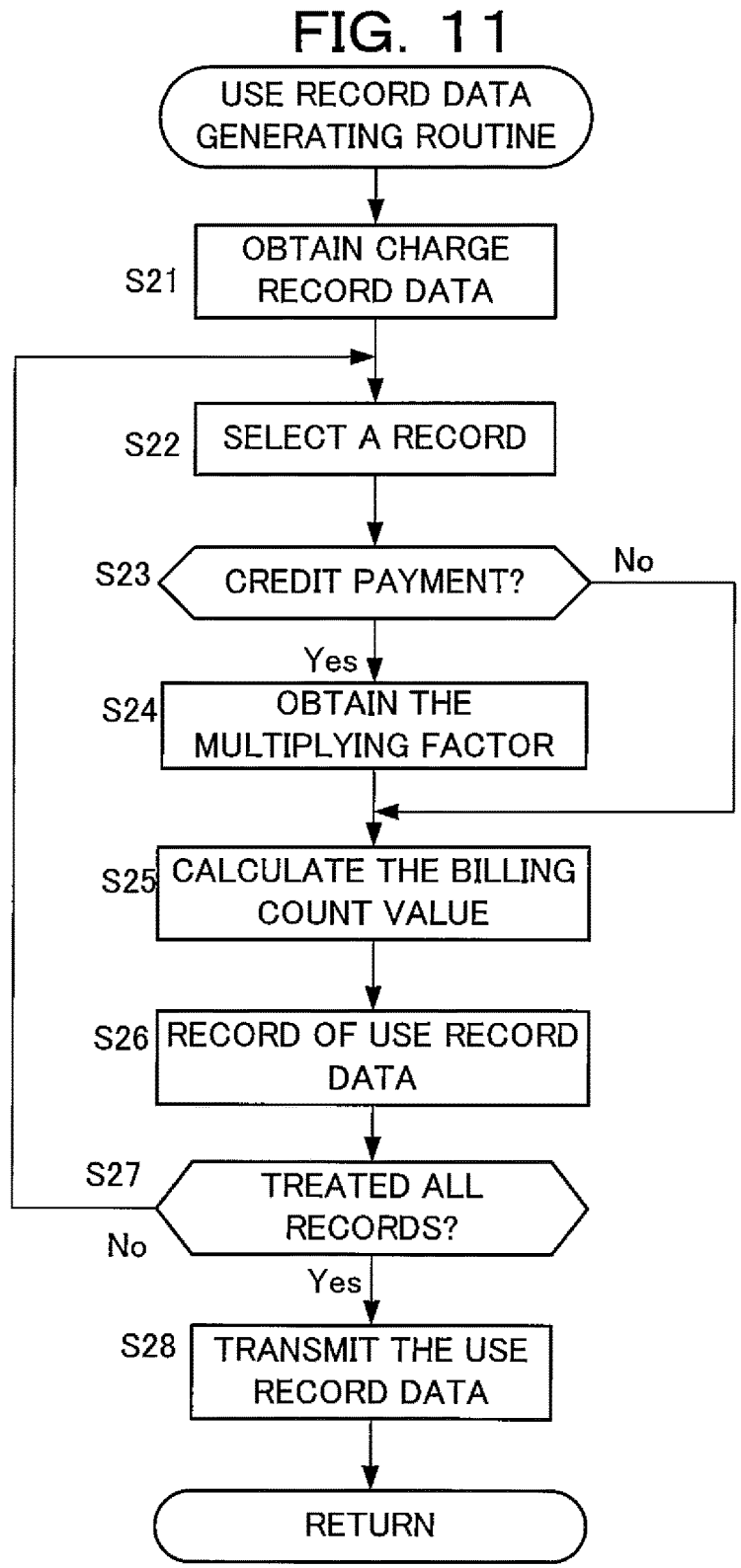
FIG. 11 is a flow chart showing a use-record-data generating routine which is implemented by a use record management portion.

The charge record data which is generated through the process of step S10, is transferred to the use record management portion 23 at an appropriate timing, and after that, is initialized. The use record management portion 23 implements the use-record-data generating routine shown in FIG. 11, using the charge record data. When starting the routine, the use record management portion 23 obtains the charge record data at step S21. In this case, the charge management portion 22 may transmit the charge record data and the use record management portion 23 may receive this. Alternatively, the use record management portion 23 may read out the charge record data though the charge management portion 22, or by accessing the storage device 28 directly. At next step S22, the use record management portion 23 selects one record included in the charge record data as a processing object. At successive step S23, the use record management portion 23 determines whether or not the credit payment has been used for paying the game-play fee of the game event included in the record of the processing object, namely, determines whether or not the game-play fee has been paid by the consumption of credit. In a case that the credit payment has been used, the use record management portion 23 goes to step S24 to obtain from the multiplying factor table 111, the multiplying factor Mx correlated to the game event included in the processing object. At successive step S25, the use record management portion 23 multiplies the consumption number of credits by the obtained multiplying factor Mx and the conversion rate CR to calculate the billing count value corresponding to the consumption number of credits.

After that, the use record management portion 23 goes to step S26 to generate a record where the billing count value calculated and the information for determining the game event are correlated to each other, and record the record in the use record data. While, in a case that it is determined at step S23 that the credit payment has not been used, that is, that the virtual money payment has been used, the use record management portion 23 skips step S24 and goes to step S25. In this case, at step S25, the use record management portion 23 sets as the billing count value, the consumption amount (the number of points) of virtual money included in the record of the processing object as it is. Then, at successive step S26, the use record management portion 23 generates a record where the billing count value and the information for determining the game event are correlated to each other, and records the record in the use record data.

After implementing the process of step S26, the use record management portion 23 goes to step S27 to determine whether or not all of the records included in the use record data have been treated. In a case that not treated record remains, the use record management portion 23 returns to step S22. In a case that all of the records have been treated, the use record management portion 23 goes to step S28 to transmit the use record data to the bill treatment system 43 of the service system 40. After that, the use record management portion 23 terminates the routine of this time. In the data transmitted at step S28, information for specifying the operator 2 who charges the content use fee is also included. For example, an ID uniquely set to each operator 2, an ID uniquely set to each store, or the like is attached to the use record data. The bill treatment system 43 stores in the storage device 46 the use record data transmitted, and at an appropriate frequency, refers to the use record data and calculates the billing amount of content use fee.

Figure 12:
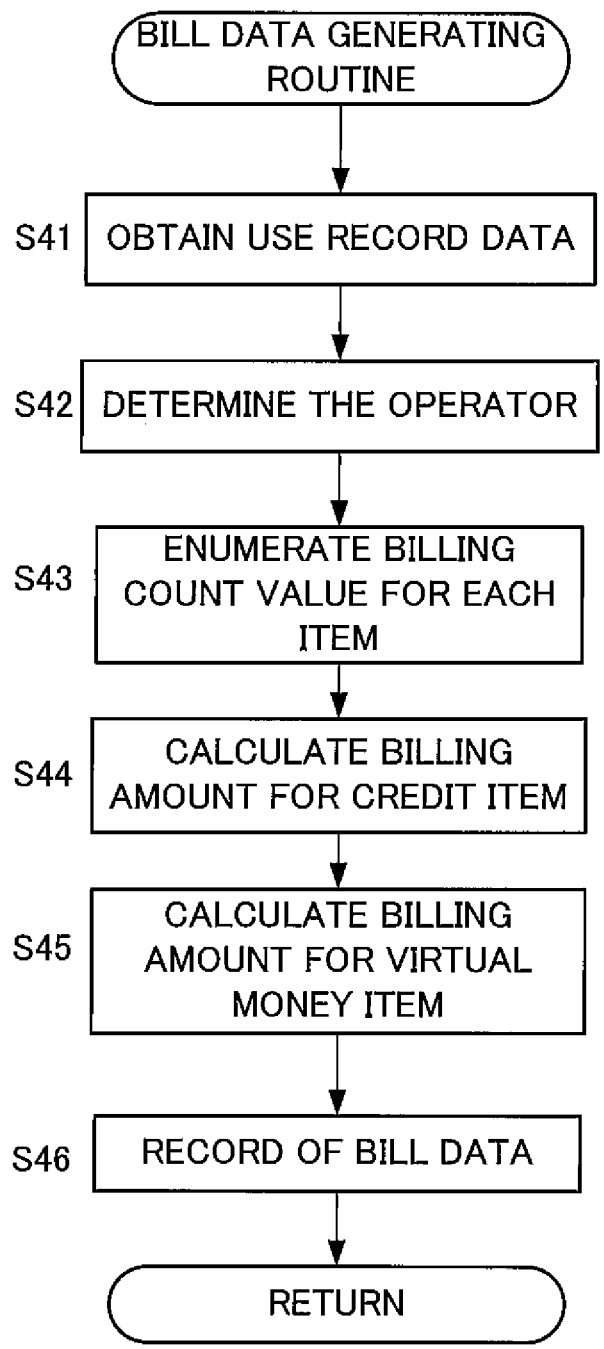
FIG. 12 is a flow chart showing a bill data generating routine which is implemented by bill treatment system.

FIG. 12 shows a bill data generating routine which is implemented at an appropriate routine for calculating the billing amount of content use fee by the bill treatment system 43. When starting the bill data generating routine, the bill treatment system 43 obtains the use record data of the processing object at step S41, and at successive step S42, determines the operator corresponding to the billing amount to be calculated. In order to determine the operator 2, the mentioned ID of operator 2 or store can be used. At next step S43, the bill treatment system 43 classifies the game events in the records included in the use record data into the credit item and the virtual money item, referring to the item determination table 120, and enumerates the billing count value for each item. The each-item enumeration portion 44 is in charge of the processes up here, and the charge management portion 45 is in charge of the following processes.

At successive step S44, the bill treatment system 43 calculates the billing amount for the credit item by multiplying the enumerated value of the billing count value of the credit item by the unit price Uc of the unit price table 130. At successive step S45, the bill treatment system 43 calculates the billing amount for the virtual money item by multiplying the enumerated value of the billing count value of the virtual money item by the unit price Uv of the unit price table 130. Further, the bill treatment system 43 records the billing amount calculated each of at step S44 and step S45 and the item in association with each other in the bill data. Besides the enumerated value, the billing amount for each item may be also recorded. After that, the bill treatment system 43 terminates the routine shown in FIG. 12. By repeating the above mentioned processes at a frequency of billing the content use fee (as one example, monthly), it is possible to obtain the bill data where the billing amount of content use fee which the service administrator 4 should charge the operator 2 is recorded. Based on the bill data obtained, the bill of content use fee is transmitted to the operator 2.

Figure 13:
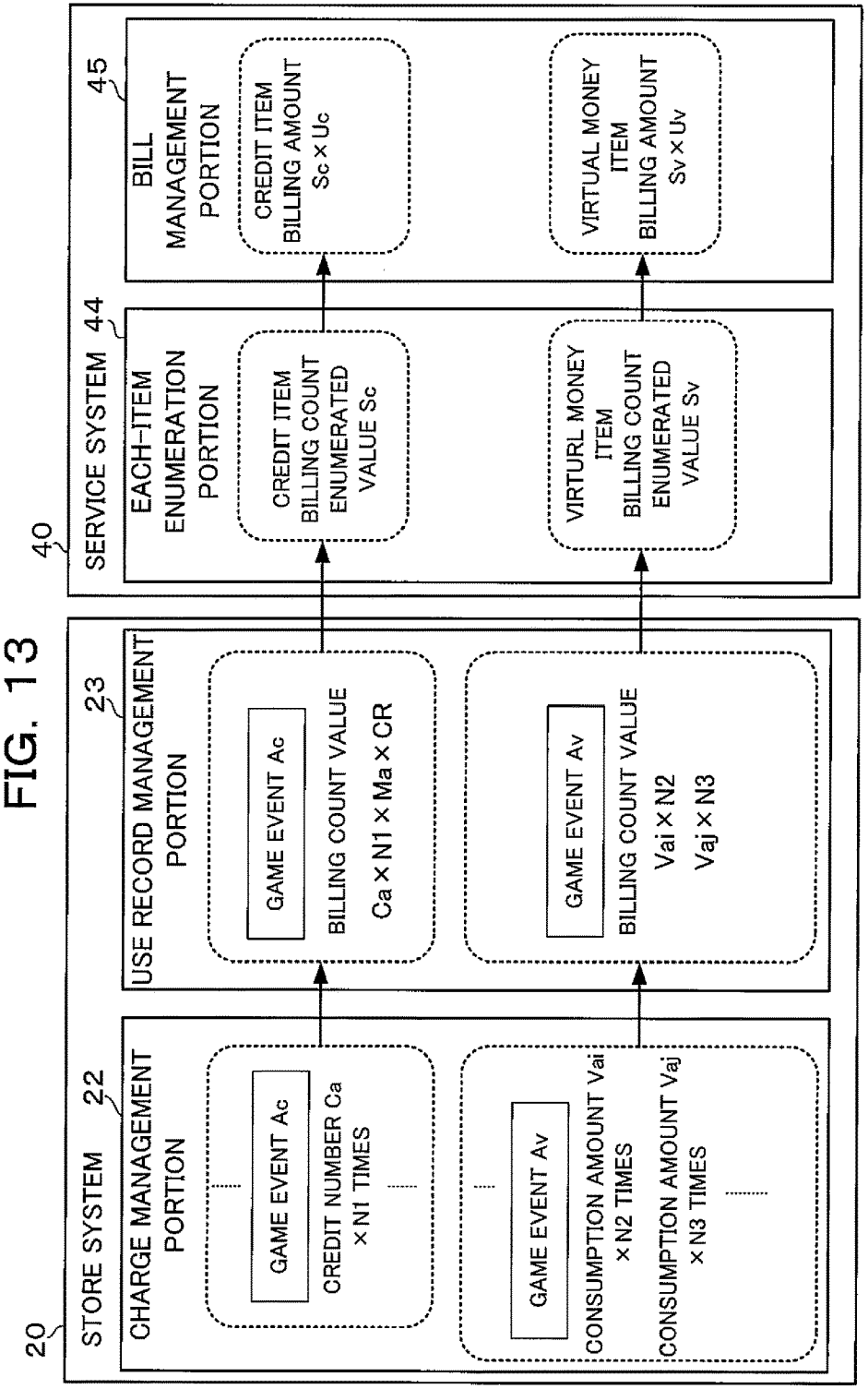
FIG. 13 is a diagram showing one example a flow for calculating a billing amount of a use fee of content based on charge record data.

FIG. 13 shows an example of processing in which the mentioned charge record data reaches the bill data. In the example shown in FIG. 3, the charge record data generated by the charge management portion 22 includes the records of the game event Ac repeated N1 times in exchange of the consumption number of credits Ca per time, the records of the game event Av repeated N2 times in exchange of the consumption of virtual money points Vai per time, and the records of the game event Av repeated N3 times in exchange of the consumption of virtual money points Vaj per time. As shown in FIG. 6, the number of consumption units corresponding to the game event Av is "Va". Here, it is assumed that the number of consumption units Va is the minimum value, and the virtual money is consumed, the amount of which is at least the minimum value. Namely, it is assumed that the Vai and the Vaj indicate the values not less than the number of consumption units Va, and are different from each other.

When the charge record data including the above records is transferred to the use record management portion 23, with respect to the game event Ac, the billing count value is calculated by multiplying the credit number Ca by the times N1, the multiplying factor Ma, and the conversion rate CR. While, with respect to the game event Av, the product of the number of consumption units Vai and the times N2, and the product of the number of consumption units Vaj and the times N3 are calculated successively, and the total of those products is calculated as the billing count value. Both of the billing count values are included in the use record data and transferred to the each-item enumeration portion 44 of the service system 40. In the each-item enumeration portion 44, the billing count enumerated value Sc for the credit item is calculated so as to include the billing count value corresponding to the game event Ac, and the billing count enumerated value Sv for the virtual money item is calculated so as to include the billing count value corresponding to the game event Av. Then, by the bill management portion 45, the billing amount of content use fee is calculated for each item, by multiplying the enumerated values Sc, Sv by the unit prices Uc, Uv respectively.

As mentioned above, according to the present embodiment, with respect to the consumption of monetary value equivalent to the game-play fee by the user 9, there are the payment method using the credit as the consumption unit, and the payment method using the virtual money as the consumption unit, and the correlation between the unit of credit and the monetary value is different from the correlation between the unit of point and the monetary value. However, in the processing for calculating the content use fee based on each of the consumption record, the credit number, the monetary value per one unit of which is big, is converted by the conversion rate CR to the billing count value which is the unit system same as the virtual money. Accordingly, with respect to the number of digits, the unit price at the moment when the counter value based on the consumption amount of credits (the content use fee) is calculated can be equalized to the unit price at the moment when the counter price based on the consumption amount of virtual money is calculated. Thereby, it is possible to lower the risk that a mistake in calculation is induced because of such a mistake as the unit price having a wrong number of digits is set in the unit table 130 by confusing the difference in the unit system between the credit payment and the virtual money payment.

Further, with respect to the calculation of the content use fee, the present invention does not enumerate the degree of use of content such as the number of times the game event is implemented (the number of times of game-play), but records in the charge record data the consumption amount obtained by enumerating monetary value consumed by the user by a predetermined unit, and calculates the billing amount of content use fee by enumerating the consumption amount within a predetermined term and multiplying the enumerated value by the unit price. Accordingly, for example, in a case that the operator 2 changes the credit number shown in FIG. 5 and/or the number of consumption units shown in FIG. 6 to execute the so-called variable charge, the billing amount of content use fee is calculated based on the consumption amount after changed. Because of this, even if the game-play fee is marked down with respect to a specified game event which has declined in popularity, the distribution rate of income between the operator 2 and the service administrator 4 does not change before and after the markdown. Accordingly, the income of the operator 2 is not weighed on in a unilateral way, and it is possible to execute the variable charge easily. Particularly, with respect to the virtual money item of game event, it is possible to set, as the content use fee (the billing amount of virtual money item shown in FIG. 13), the value obtained by multiplying the amount of virtual money consumed actually by the user as it is by the unit price. Thereby, it is possible to distribute the fee the user paid more appropriately between the operator 2 and the service administrator 4. With respect to the credit item, the correlation between the number of coins and the credit number intervenes. Therefore, it could happen that the game-play fee (the monetary value) represented by the currency unit is not always proportional to the consumption amount enumerated in units of credit. However, even in this case, by obtaining an average value of the correlations between the number of units by the credit and the currency unit, it is possible to consider that the monetary value by the currency unit is enumerated by being replaced with the unit system of credit. Accordingly, it is possible to calculate the content use fee more appropriately than a case that the content use fee is calculated depending on the degree of use such as the number of times that the game is played and the number of times that the content is used.

In the above embodiment, the payment device by cash (coins) is configured in cooperation with the coin input device 27 and the charge management portion 22. The payment device by virtual money is configured in cooperation with the card reader 26, the charge management portion 22, and the charge management system 42. Further, the whole of the amusement system 1 corresponds to the service system of the present invention. The service administrator 4 and the operator 2 correspond to the first party and the second party respectively. The combination of the use record management portion 23, the storage device 28, and the bill treatment system 43 of the amusement system 1 correspond to the value computing system. The storage device 28 corresponds to the conversion coefficient storage device. The conversion rate CR recorded in the storage device 28 corresponds to the conversion coefficient. The use record management portion 23 functions as the consumption record data obtaining device by implementing the process of step S21 shown in FIG. 11, and functions as the conversion coefficient obtaining device and the enumerated value calculation device by implementing the process of step S25. The bill treatment system 43 functions as the value determination device by implementing the processes of steps S41 to S45.

The present invention is not limited to the embodiment mentioned above, and can be varied depending on the situation. For example, in the above embodiment, the bill treatment system 43 is configured by using a computer of the server 5 or the administrator terminal 8 of the service administrator 4, but the system may be also configured in the following way. A logical device equivalent to the each-item enumeration portion 4 and the charge management portion 45 is configured within the store system 20, and all of processes up to the calculation of the content use fee are implemented within the store system 20, and the bill data generated is provided to the service administrator 4.

The service system to which the present invention is applied is not limited to the amusement system, and the preset invention can be applied to various kinds of service systems, as long as the second party provides a service to a user by using an element provided by the first party, and makes the user consume monetary value equivalent to the service, and the counter value depending on the monetary value consumed by the user is charged to the second party from the first party. For example, the service which is provided by the second party is not limited to the service which makes a user play a game by using a game terminal. The present invention can be also applied to the following case under the situation where, by making a user use a physical apparatus or facility, or by providing intangible service to a user, the second party charges the user the use fee. An element is provided by the first party to the second party, and the first party charges the second party the counter value of the element, the element including the physical element such as at least one part of the hardware or software of the apparatus, operating the apparatus, or intellectual property to be provided as the intangible service. Namely, the second party is not only the actor who operates the physical apparatus or facility to be used by the user, but also may be a party who provides only intangible service. It does not matter whichever the party is a natural person or an artificial parson. The party is at least an actor who runs some business, including an autonomous body, any kind of association, an educational and training institution such as a university, and the like. It does not matter whichever the business is commercial or uncommercial. The user is also not limited to a natural person, and may be an artificial parson or the like. The payment method for making a user consume the monetary value is not limited to the example that the cash payment using coins and the payment using virtual money are prepared in a selectable manner, and various kinds of payment methods including a credit card or the like may be selected depending on the situation.

As explained above, according to the first embodiment of the present invention, as the counter value is determined based on the consumption amount of monetary value enumerated by a payment device and a predetermined unit price, by executing the variable charge, even if changed is the correlation between the service and the consumption amount of monetary value to be enumerated by the payment device as the use fee of the service, it is possible to calculate the value on which the change is reflected. Thereby, with respect to the use fee of service, it is possible to execute easily a flexible measure such as the variable charge. Further, according to the second embodiment, the consumption amount enumerated by each payment device is replaced with the enumerated value of the same unit system by following the conversion coefficient, and the counter value is calculated by those enumerated values and the unit price. Therefore, it is possible to calculate the value appropriate for the consumption amount, while excluded is the effect that the difference in the correlation between the unit for calculating the consumption amount and the monetary value has on the unit price setting.

What is claimed is:

1. A value computing system being applied to a service system for use in operating a game machine to allow a user to use service of the game machine to play a game, in which at least a part of elements necessary for making the user use service of the game machine are provided from a first party to a second party;
   wherein a fee is charged the user for the service of the game machine and the second party makes the user consume monetary value equivalent to the fee for the service of the game machine via a predetermined payment apparatus associated with the game machine;
   wherein a counter value depending on the monetary value consumed by the user for the service of the game machine is charged from the first party to the second party;
   the value computing system comprises:
   a gaming machine coupled to a server computer, the gaming machine including:
   a coin input device adapted to receive physical coins associated with a first payment method;
   a card reader adapted to receive a physical card including a medium ID associated with an account of virtual money associated with a second payment method; and
   a computer unit configured to execute a computer program to function as:
   a payment apparatus programmed so as to enumerate a consumption amount of the monetary value by the user by following a predetermined unit associated with a payment method used by the user, the payment method including at least one of coins, currency, and virtual money;
   wherein a correlation between the service of the game machine to be provided to the user and the consumption amount of the monetary value to be enumerated for use of the service of the game machine by the payment apparatus is changeable;
   wherein the payment apparatus is programmed so as to enumerate the consumption amount using as the predetermined unit, one kind of unit of according to the payment method through which the monetary value has been consumed by the user within a plurality of kinds of units, each kind of unit being different from each other in a correlation with the monetary value;
   wherein the payment apparatus is programmed to:
   upon receiving a signal from the coin input device indicating a number of coins being received from the user, enumerate the consumption amount of the monetary value associated with the first payment method by determining a number of credits associated with the received number of coins using a credit unit; and
   upon receiving a signal from the card reader indicating the medium ID associated with an account of virtual money, enumerate the consumption amount of the monetary value associated with the second payment method by determining a number of points associated with virtual money using a point unit;
   a storage device storing the plurality of kinds of units in association with unit prices respectively, each unit price being set uniquely to each kind of unit in a predetermined currency unit; and
   a consumption record data obtaining device which is a configured to obtain from the payment apparatus, consumption record data including the consumption amount of monetary value enumerated for the use of the service of the game machine by the payment apparatus;
   a conversion coefficient storage device which is configured to store a conversion coefficient to correct the difference in the correlation between the unit for enumerating the consumption amount of the monetary value and to treat the consumption amount of the monetary value for each payment method as an enumerated value in a same unit system among the plurality of payment methods; and
   an enumerated value calculation device which is configured to calculate the enumerated value corresponding to the consumption amount of each payment method, based on the consumption amount of each payment method included in the consumption record data and the conversion coefficient stored in the conversion coefficient storage device; and
   the server computer coupled to each gaming machine, the configured to execute a computer program to function as:
   a value determination device which is configured to determine the counter value to be charged from the first party to the second party, based on the consumption amount included in the consumption record data and the unit price associated with the kind of unit used for enumerating the consumption amount, the unit price being set in the predetermined currency unit.

2. A value computing system according to claim 1, wherein the payment apparatus includes a payment device which is configured to make the user consume virtual money an amount of which is equivalent to the fee, as a payment device which makes the user consume monetary value equivalent to the fee of the service, the consumption record data obtaining device is configured to obtain from the device apparatus, virtual money consumption record data where a consumption amount of the virtual money possessed by the user for the use of the service is enumerated by following a predetermined unit, and the value determination device is configured to determine the counter value to be charged from the first party to the second party based on the consumption amount of the virtual money included in the virtual money consumption record data and the unit price.

3. A non-transitory storage medium storing a computer program being applied to a service system for use in operating a game machine to allow a user to use service of the game machine to play a game, in which at least a part of elements necessary for making the user use service of the game machine are provided from a first party to a second party;
   wherein a fee is charged the user for the service of the game machine and the second party makes the user consume monetary value equivalent to the fee for the service of the game machine;
   wherein a counter value depending on the monetary value consumed by the user for the service of the game machine is charged from the first party to the second party;
   the computer program, when executed by a computer unit of the service system, causes the service system to function as a value computing system including:
   a plurality of gaming machines coupled to a server computer, each gaming machine including:
   a coin input device adapted to receive physical coins associated with a first payment method;
   a card reader adapted to receive a physical card including a medium ID associated with an account of virtual money associated with a second payment method; and a computer unit configured to function as:
a payment apparatus programmed so as to enumerate a consumption amount of the monetary value by the user by following a predetermined unit associated with a payment method used by the user, the payment method including at least one of coins, currency, and virtual money;
wherein a correlation between the service of the game machine to be provided to the user and the consumption amount of the monetary value to be enumerated for use of the service of the game machine by the payment apparatus is changeable, and having a computer which executes a computer program to calculate the counter value to be charged from the first party to the second party,
wherein the payment apparatus is programmed so as to enumerate the consumption amount using as the predetermined unit, one kind of unit according to the payment method through which the monetary value has been consumed by the user within a plurality of kinds of units, each kind of unit being different from each other in a correlation with the monetary value;
wherein the payment apparatus is programmed to:
upon receiving a signal from the coin input device indicating a number of coins being received from the user, enumerate the consumption amount of the monetary value associated with the first payment method by determining a number of credits associated with the received number of coins using a credit unit; and
upon receiving a signal from the card reader indicating the medium ID associated with an account of virtual money, enumerate the consumption amount of the monetary value associated with the second payment method by determining a number of points associated with virtual money using a point unit;
a storage device storing the plurality of kinds of units in association with unit prices respectively, each unit price being set uniquely to each kind of unit in a predetermined currency unit; and
a consumption record data obtaining device which is configured to obtain from the payment apparatus, consumption record data including the consumption amount of monetary value enumerated for the use of the service of the game machine by the payment apparatus,
a conversion coefficient storage device which is configured to store a conversion coefficient to correct the difference in the correlation between the unit for enumerating the consumption amount of the monetary value and to treat the consumption amount of the monetary value for each payment method as an enumerated value in a same unit system among the plurality of payment methods; and
an enumerated value calculation device which is configured to calculate the enumerated value corresponding to the consumption amount of each payment method, based on the consumption amount of each payment method included in the consumption record data and the conversion coefficient stored in the conversion coefficient storage device; and
a server computer coupled to each gaming machine, the configured to execute a computer program to function as:
a value determination device which is configured to determine the counter value to be charged from the first party to the second party, based on the consumption amount included in the consumption record data and the unit price associated with the kind of unit used for enumerating the consumption amount, the unit price being set in the predetermined currency unit.

4. A value computing system being applied to a service system for use in operating a game machine to allow a user to use service of the game machine to play a game, in which at least a part of elements necessary for making the user use service of the game machine are provided from a first party to a second party;
wherein a fee is charged the user for the service of the game machine and the second party makes the user consume monetary value equivalent to the fee for the service of the game machine;
wherein a counter value depending on the monetary value consumed by the user for the service of the game machine is charged as a counter value for provision of the element from the first party to the second party;
the value computing system comprises:
a plurality of gaming machines coupled to a server computer, each gaming machine including:
a coin input device adapted to receive physical coins associated with a first payment method;
a card reader adapted to receive a physical card including a medium ID associated with an account of virtual money associated with a second payment method; and
a computer unit configured to execute a computer program to function as:
a payment apparatus programmed so that the user can select one of a plurality of payment methods which are different from each other in a correlation between a unit for enumerating a consumption amount of the monetary value, the plurality of payment method including at least one of coins, currency, and virtual money, the payment apparatus is programmed to:
upon receiving a signal from the coin input device indicating a number of coins being received from the user, enumerate the consumption amount of the monetary value associated with the first payment method by determining a number of credits associated with the received number of coins using a credit unit; and
upon receiving a signal from the card reader indicating the medium ID associated with an account of virtual money, enumerate the consumption amount of the monetary value associated with the second payment method by determining a number of points associated with virtual money using a point unit;
a consumption record data obtaining device which is configured to obtain from the payment apparatus, consumption record data where the consumption amount of the monetary value is represented by using the number of units for each payment method;
a storage device storing the plurality of kinds of units for the plurality of payment methods in association with unit prices respectively, each unit price being set uniquely to each kind of unit in a predetermined currency unit;
a conversion coefficient storage device which is configured to store a conversion coefficient to correct the difference in the correlation between the unit for enumerating the consumption amount of the monetary value and to treat the consumption amount of the monetary value for each payment method as an enumerated value in a same unit system among the plurality of payment methods; and
an enumerated value calculation device which is configured to calculate the enumerated value corresponding to the consumption amount of each payment method, based on the consumption amount of each payment method included in the consumption record data and the conversion coefficient stored in the conversion coefficient storage device; and the server computer coupled to each gaming machine, the configured to execute a computer program to function as:

a value determination device which is configured to determine the counter value to be charged from the first party to the second party, based on the enumerated value of each payment method obtained by the enumerated value calculation device and the unit price associated with the payment method, the unit price being set in the predetermined currency unit.

5. A value computing system according to claim 4, wherein a first payment method and a second payment method are prepared as the plurality of payment methods, the unit for enumerating the consumption amount by the first payment method is correlated to the monetary value which is bigger in the number of digits thereof than the monetary value to which the unit for enumerating the consumption amount by the second payment method, and the conversion coefficient is set so as to equalize in the number of digits the consumption amount to be enumerated by following a unit system of the first payment method to the consumption amount to be enumerated by following a unit system of the second payment method.

6. A value computing system according to claim 5, wherein the first payment method is a payment method with cash, and the second payment method is a payment method with virtual money.

7. A value computing system according to claim 4, wherein a plurality of kinds of services is available to be used by the user, and the enumerated value calculation device calculates the enumerated value by multiplying the consumption amount by a multiplying factor set depending on content of the service and the conversion coefficient.

8. A value computing system according to claim 4, wherein the service of the game machine is used by the user via the game machine the second party operates, a content which is used at the game machine is provided from the first party to the second party as the element, and a use fee for the content is charged as the counter value from the first party to the second party.

9. A value computing system according to claim 8, wherein the game machine is a game machine for business use.

10. A non-transitory computer readable storage storing a computer program being applied to a service system for use in operating a game machine to allow a user to use service of the game machine to play a game, in which at least a part of elements necessary for making the user use service of the game machine are provided from a first party to a second party;

wherein a fee is charged the user for the service of the game machine and the second party makes the user consume monetary value equivalent to the fee for the service of the game machine;

wherein a counter value depending on the monetary value consumed by the user for the service of the game machine is charged as a counter value for provision of the elements from the first party to the second party;

the computer program, when executed by a computer unit of the service system, causes the service system to function as a value computing system including:

a plurality of gaming machines coupled to a server computer, each gaming machine including:

a coin input device adapted to receive physical coins associated with a first payment method;

a card reader adapted to receive a physical card including a medium ID associated with an account of virtual money associated with a second payment method; and a computer unit configured to function as:

a payment apparatus programmed so that the user can select one of a plurality of payment methods which are different from each other in a correlation between a unit for enumerating a consumption amount and the monetary value, the plurality of payment method including at least one of coins, currency, and virtual money, the payment apparatus is programmed to:

upon receiving a signal from the coin input device indicating a number of coins being received from the user, enumerate the consumption amount of the monetary value associated with the first payment method by determining a number of credits associated with the received number of coins using a credit unit; and upon receiving a signal from the card reader indicating the medium ID associated with an account of virtual money, enumerate the consumption amount of the monetary value associated with the second payment method by determining a number of points associated with virtual money using a point unit;

a consumption record data obtaining device which is configured to obtain from the payment apparatus, consumption record data where the consumption amount of the monetary value is represented by using the number of units for each payment method;

a storage device storing the plurality of kinds of units for the plurality of payment methods in association with unit prices respectively, each unit price being set uniquely to each kind of unit in a predetermined currency unit;

a conversion coefficient storage device which is configured to store a conversion coefficient to correct the difference in the correlation between the unit for enumerating the consumption amount of the monetary value and to treat the consumption amount of the monetary value for each payment method as an enumerated value in a same unit system among the plurality of payment methods; and an enumerated value calculation device which is configured to calculate the enumerated value corresponding to the consumption amount of each payment method, based on the consumption amount of each payment method included in the consumption record data and the conversion coefficient stored in the conversion coefficient storage device; and the server computer coupled to each gaming machine, the configured to execute a computer program to function as:

a value determination device which is configured to determine the counter value to be charged from the first party to the second party, based on the enumerated value of each payment method obtained by the enumerated value calculation device and the unit price associated with the payment method, the unit price being set in the predetermined currency.

* * * * *